(12) United States Patent
Holtmanns et al.

(10) Patent No.: US 10,200,865 B2
(45) Date of Patent: Feb. 5, 2019

(54) ADAPTIVE SECURITY INDICATOR FOR WIRELESS DEVICES

(71) Applicant: Nokia Technologies Oy, Espoo (FI)

(72) Inventors: Silke Holtmanns, Klaukkala (FI); Janne Uusilehto, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/914,531

(22) PCT Filed: Aug. 29, 2013

(86) PCT No.: PCT/US2013/057277
§ 371 (c)(1),
(2) Date: Feb. 25, 2016

(87) PCT Pub. No.: WO2015/030771
PCT Pub. Date: Mar. 5, 2015

(65) Prior Publication Data
US 2016/0205128 A1    Jul. 14, 2016

(51) Int. Cl.
*H04W 12/08*    (2009.01)
*H04L 29/06*    (2006.01)
(Continued)

(52) U.S. Cl.
CPC ......... *H04W 12/08* (2013.01); *H04L 63/1425* (2013.01); *H04L 63/20* (2013.01);
(Continued)

(58) Field of Classification Search
CPC ..... H04W 12/08; H04W 84/18; H04W 24/08; G06F 21/00; G06F 21/51; H04L 41/0803
See application file for complete search history.

(56) References Cited

U.S. PATENT DOCUMENTS 5,517,568 A * 5/1996 Grube .................. H04K 1/00
380/2
6,965,674 B2 * 11/2005 Whelan ................ H04L 9/0891
380/270
(Continued)

FOREIGN PATENT DOCUMENTS

EP    1564964 A2    8/2005

OTHER PUBLICATIONS

Formalizing the Design, Evaluation, and Analysis of Quality of Protection in Wireless Networks, Sun-Hee Lim et al, http://ieeexplore.ieee.org/document/6388417/; Pub. Dt: Dec. 24, 2012.*
(Continued)

*Primary Examiner* — Taghi T Arani
*Assistant Examiner* — Badridot Champakesanatusptodotgov
(74) *Attorney, Agent, or Firm* — Mintz Levin Cohn Ferris Glovsky and Popeo, P.C.

(57) ABSTRACT

Methods and apparatus, including computer program products, are provided for adaptive security. In one aspect there is provided a method. The method may include receiving, at a user equipment, at least one policy update representative of a rule defining at least one of a security level and an operation allowed to be performed at the security level; monitoring a configuration of the user equipment to determine whether the configuration of the user equipment violates the at least one policy update; and adapting, based on the monitoring, at least one of a security indicator at the user equipment and the operation at the user equipment. Related apparatus, systems, methods, and articles are also described.

15 Claims, 5 Drawing Sheets

(51) Int. Cl.
*H04M 1/725* (2006.01)
*H04W 88/02* (2009.01)

(52) U.S. Cl.
CPC ..... *H04L 63/1433* (2013.01); *H04M 1/72577* (2013.01); *H04W 88/02* (2013.01)

(56) References Cited

U.S. PATENT DOCUMENTS

| | | | | |
|---|---|---|---|---|
| 7,146,006 B1* | 12/2006 | Coron | G06F 7/58 | 380/29 |
| 7,437,763 B2* | 10/2008 | Guo | G06F 21/57 | 726/1 |
| 7,716,727 B2* | 5/2010 | Phillips | H04L 63/1441 | 713/154 |
| 8,365,246 B2* | 1/2013 | Readshaw | G06F 21/577 | 726/2 |
| 8,539,571 B2* | 9/2013 | Smith | H04L 63/083 | 370/392 |
| 2003/0030680 A1 | 2/2003 | Cofta | H04L 63/105 | 715/864 |
| 2004/0098610 A1* | 5/2004 | Hrastar | H04L 41/0893 | 726/1 |
| 2005/0182967 A1* | 8/2005 | Phillips | H04L 63/1408 | 726/5 |
| 2006/0031476 A1* | 2/2006 | Mathes | H04L 41/0886 | 709/224 |
| 2007/0113080 A1 | 5/2007 | Shankar et al. | | |
| 2007/0157319 A1* | 7/2007 | Kammer | G06F 21/6218 | 726/27 |
| 2007/0203719 A1* | 8/2007 | Kenagy | G06Q 20/10 | 705/39 |
| 2008/0229382 A1* | 9/2008 | Vitalos | H04L 63/0263 | 726/1 |
| 2009/0089584 A1* | 4/2009 | Bender | H04L 9/3236 | 713/176 |
| 2009/0178144 A1* | 7/2009 | Redlich | G06F 21/6209 | 726/27 |
| 2010/0100930 A1* | 4/2010 | King | H04L 63/1433 | 726/1 |
| 2010/0146270 A1* | 6/2010 | Adams | H04L 29/06 | 713/166 |
| 2012/0060222 A1* | 3/2012 | Mahaffey | G06F 21/554 | 726/25 |
| 2012/0131685 A1* | 5/2012 | Broch | G06F 21/554 | 726/30 |
| 2013/0007837 A1* | 1/2013 | King | H04L 63/1433 | 726/1 |
| 2013/0007848 A1* | 1/2013 | Chaskar | H04W 12/12 | 726/4 |
| 2013/0035062 A1* | 2/2013 | Vered | G06F 21/554 | 455/410 |
| 2013/0117812 A1* | 5/2013 | Ponchel | G06F 21/552 | 726/1 |
| 2013/0129086 A1* | 5/2013 | Tang | H04L 9/0861 | 380/44 |
| 2014/0082739 A1* | 3/2014 | Chess | G06F 21/577 | 726/25 |
| 2014/0337614 A1* | 11/2014 | Kelson | H04L 63/168 | 713/152 |

OTHER PUBLICATIONS

International Search Report and Written Opinion received for corresponding Patent Cooperation Treaty Application No. PCT/US2013/057277, dated Aug. 29, 2013, 10 pages.
"Mobile Device Managment (MDM)", <http://www.airwatch.com/solutions/mobile-device-managment>.
"Understanding Security and Encryption", <http://www.twistpair.com/inc/data/userguides/Blackberry Guide.pdf>.
3GPP, "Technical Specification Group Radio Access Network; Evolved Universal Terrestrial Radio Access (E-UTRA); LTE physical layer: General description (Release 11)," 3rd Generation Partnership Project, 3GPP TS 36.201 V11.1.0, Dec. 2012.
3GPP, "Technical Specification Group Radio Access Network; Evolved Universal Terrestrial Radio Access (E-UTRA); Multiplexing and channel coding (Release 11)," 3rd Generation Partnership Project, 3GPP TS 36.212 V11.3.0, Jun. 2013.
3GPP, "Technical Specification Group Radio Access Network; Evolved Universal Terrestrial Radio Access (E-UTRA); Physical Channels and Modulation (Release 11)," 3rd Generation Partnership Project, 3GPP TS 36.2011 V11.3.0, Jun. 2013.
3GPP, "Technical Specification Group Radio Access Network; Evolved Universal Terrestrial Radio Access (E-UTRA); Physical layer procedures (Release 11)," 3rd Generation Partnership Project, 3GPP TS 36.213 V11.3.0, Jun. 2013.
3GPP, "Technical Specification Group Radio Access Network; Evolved Universal Terrestrial Radio Access (E-UTRA); Physical Layer; Measurements (Release 11)," 3rd Generation Partnership Project, 3GPP TS 36.214 V11.1.0, Dec. 2012.

* cited by examiner

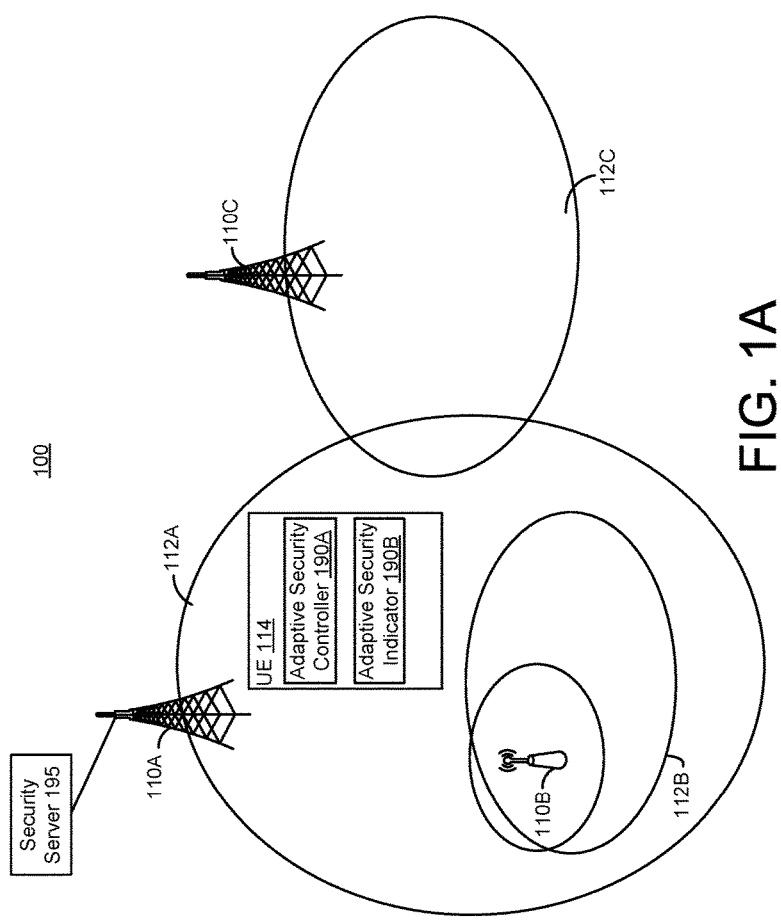

ADAPTIVE SECURITY INDICATOR FOR WIRELESS DEVICES

RELATED APPLICATION

This application was originally filed as Patent Cooperation Treaty Application No. PCT/US2013/057277 filed Aug. 29, 2013.

FIELD

The subject matter described herein relates to wireless communications.

BACKGROUND

Wireless devices, such smartphones, tablets, and the like, have become an increasingly common and integral part of everyday life. Indeed, wireless devices are used to send text, emails, and network socially, pay bills, take pictures, monitor health, track diet, listen to music, watch movies, browse, online shopping, and a variety of operations. Concurrent with the rise of wireless devices is the rise of security risks associated with their use. For example, sending private confidential email over an unencrypted or weakly encrypted wireless link may make the device vulnerable to attacks, such as eavesdropping and the like. However, the complexity of wireless devices and the security technologies used make it difficult for a user to detect and understand the impact of such vulnerabilities. Due to scientific advances and increasing computational power, security technologies that were secure to use a few years ago have become unsecure. This increases the complexity for a user to evaluate his or her own data risk.

SUMMARY

Methods and apparatus, including computer program products, are provided for adaptive security. In one aspect there is provided a method. The method may include receiving, at a user equipment, at least one policy update representative of a rule defining at least one of a security level and an operation allowed to be performed at the security level; monitoring a configuration of the user equipment to determine whether the configuration of the user equipment violates the at least one policy update; and adapting, based on the monitoring, at least one of a security indicator at the user equipment and the operation at the user equipment.

In some variations, one or more of the features disclosed herein including the following features can optionally be included in any feasible combination. The at least one policy update may be updated at least one of, periodically, when requested by the user equipment, and in response to an event prompting a change in policy, wherein the policy update may be received from a server configured to provide a plurality of security policies including the at least one policy update. The event may include a security event indicating a vulnerability to the user equipment. The operation may further include at least one of an application at the user equipment, a type of connection between the user equipment and a network, and a function at the user equipment. The adapting may further include generating, based on a result of the monitoring, the security indicator as a graphical indicator representing a plurality of security levels including the at least one security level. The result of the monitoring may indicate whether the configuration violates the policy update and/or the at least one security level. The adapting may further include inhibiting the operation at the user equipment.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

DESCRIPTION OF THE DRAWINGS

In the drawings,

FIG. 1A depicts an example of a system for adaptive security, in accordance with some exemplary embodiments;

Figure 1B:
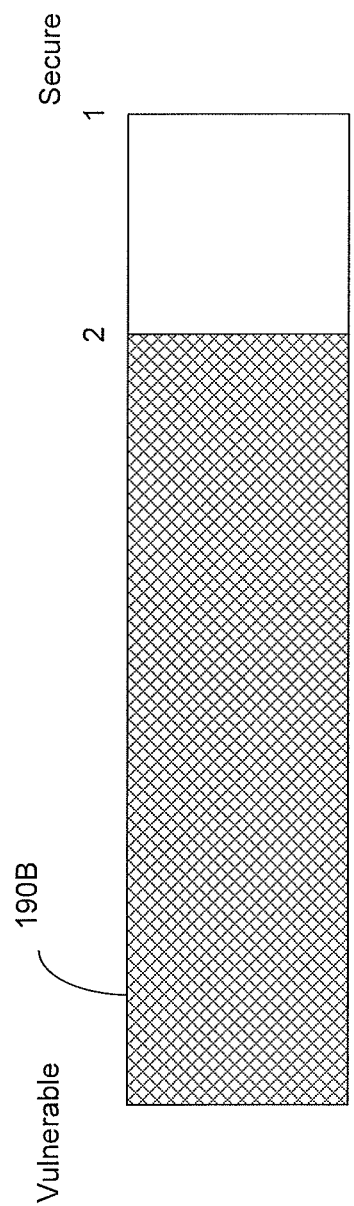
FIG. 1B depicts an example of an adaptive security indicator, in accordance with some exemplary embodiments.

Like labels are used to refer to same or similar items in the drawings.

DETAILED DESCRIPTION

In some example embodiments, the subject matter disclosed herein relates to adaptive security for a mobile wireless device, such as a user equipment and the like. The security is adaptive in the sense that the security policies used by the user equipment may be updated by, for example, a server, and this updating may be provided periodically, when requested by the wireless device, when there is an event prompting a policy change, and/or any other time. Moreover, the adaptive security disclosed herein may, in some example embodiments, modify its security policy, based on the information received from the server, to enable monitoring a state of the user equipment, such as connections being used (or being considered for use) and types of connections, applications being used (or being considered for use), functions being used (or being considered for use), encryption algorithms being used (or being considered for use), and the like.

To illustrate with an example, a user equipment including the adaptive security disclosed herein may evaluate its policies, one of which may be updated by the server to indicate that a mobile payment application is only to be used via a short messaging service, a Third Generation Partnership Project (3G)-type connection, but not via a WiFi connection or other types of connections. In this example, the user equipment including the adaptive security (also referred to herein as an adaptive security controller) may monitor, given the adaptive policy (as well as other policies including user preferences and/or corporate policies), the types of connections and/or the applications, so that if the user equipment attempts to use the mobile payment application over a WiFi connection, the user equipment/adaptive security controller may, in some example embodiments, inhibit the use of the mobile payment application and/or, at the very least, generate a message or view cautioning against using the mobile payment application over WiFi due to the vulnerability. Rather than only use static policy, the user equipment may, in some example embodiments, use policies that are thus adapted by the network including the server.

The following provides another example use case. A security algorithm, such as the Data Encryption Standard (DES), may be suspected of being hacked (or otherwise compromised), making that type of encryption vulnerable. When this is the case, the security server 195, as shown in FIG. 1A for example, may send a policy update to the user equipment. The user equipment may be using DES, and, as a result, the adaptive security controller190A may change the security level to a lower state (for example, from a level 1 to a lower, less secure level 2). If the vulnerability is later confirmed (rather than just being suspect), security server 195 may send a policy update to the user equipment to further reduce the security level (for example, to a level 5).

Although the previous example described a specific policy and application, these are merely examples as other policies, functions, algorithms and the like may be used as well by the user equipment including the adaptive security controller.

FIG. 1A depicts an example system 100 including one or more cells 112A-C (also referred to herein as coverage areas) served by corresponding wireless access points, such as base stations 110A and 110C and wireless local area network (WLAN) access points 110B. System 100 also includes one or more wireless devices, such as user equipment 114.

The user equipment 114 may, in some example embodiments, include an adaptive security controller 190A for receiving policy updates and adapting the security level of the user equipment (which may include for example inhibiting functions at the user equipment and/or generating messages regarding the security state) based on the current configuration of the user equipment. The user equipment 114 may also include an adaptive security indicator 190B for graphically depicting the security state based on the updated policy.

In some example embodiments, adaptive security controller 190A may be configured to provide an indication of the user equipment's security state to adaptive security indicator 190B. For example, the user equipment/adaptive security controller may monitor the state of the user equipment based on its policies, user preferences, corporate security (for example, in an enterprise setting), and provide information to adaptive security indicator 190B, which provides a graphical indication of the current security state. This graphical indication may be implemented as a so-called "traffic light" graphical indicator or a slider with a color scheme, providing different colors representative of the security state of the user equipment.

Although the previous example describes the graphical indication as a so-called stop light, the graphical indication of security may be implemented in any other way that allows graphical distinction of different security states of the user equipment. For example, an alphanumeric value may be presented, such as a value between 1-5, wherein 1 represents a better security state than 5. Other example of ways the adaptive security indicator 190B can be implemented graphically include a slider having different colors to indicate degree of risk, a face having different gestures to indicate degree of risk, a door that is closed, fully open, or partially open to indicate the degree of risk, a picture include a lock, fence, burglar, and the like to indicate degree of risk, a castle that varies in size to indicate degree of risk, a series of locks (for example, the quantity of locks indicates the degree of security), and any other graphical indication.

FIG. 1B depicts an example adaptive security indicator 190B presented as a graphical indicator which varies based on a current security level as determined by the adaptive security controller 190A. In this example, the security level is 4, and the level changes based on policy updates or changes in the configuration of the user equipment (for example, a change in connection, application, function, encryption type, and the like). A secure display (secure user interface) may, in some example embodiments, be used to present the indicator 190B. In a secure display, a secure element may control parts of the display to prevent a malicious application on the terminal from maliciously modifying the indicator 190B.

In some example embodiments, adaptive security indicator 190B may be configured to have a range of security levels, each of which defines one or more operations that are allowed or inhibited (for example, not allowed or discouraged).

Referring again to FIG. 1A, in some example embodiments, the user equipment 114 may be implemented as a mobile device and/or a stationary device. The user equipment are often referred to as, for example, mobile stations, mobile units, subscriber stations, wireless terminals, tablets, smart phones, wireless devices, or the like. The user equipment may be implemented as, for example, a wireless handheld device, a wireless plug-in accessory, or the like. The user equipment may, in some example embodiments, be configured to operate in a heterogeneous network including small, non-cellular access networks (for example, WLAN or WiFi access networks at 112B) and cellular access networks (for example, cells 112A and 112C). In some example embodiments configured as a heterogeneous network, user equipment may be configured as a multimode radio accessing cellular access networks via base station 110A and non-cellular access networks via access points 110B and the like.

In the example of FIG. 1A, base stations 110A and 110C may be configured as an evolved Node B (eNB) base station serving macrocells 112A and 112C (also referred to herein as cells and coverage areas). Moreover, when base stations 110A and 110C are implemented as an evolved Node B (eNB) type base station, as noted above, the base stations may be configured in accordance with standards, including the Long Term Evolution (LTE) standards, such as 3GPP TS 36.201, Evolved Universal Terrestrial Radio Access (E-UTRA); Long Term Evolution (LTE) physical layer; General description, 3GPP TS 36.211, Evolved Universal Terrestrial Radio Access (E-UTRA); Physical channels and modulation, 3GPP TS 36.212, Evolved Universal Terrestrial Radio Access (E-UTRA); Multiplexing and channel coding, 3GPP TS 36.213, Evolved Universal Terrestrial Radio Access (E-UTRA); Physical layer procedures, 3GPP TS 36.214, Evolved Universal Terrestrial Radio Access (E-UTRA); Physical layer—Measurements, and any subsequent additions or revisions to these and other 3GPP series of standards (collectively referred to as LTE standards). The base stations 110A and 110C may also be configured to provide other types of air interfaces, such as various first generation (1G) communication protocols, second generation (2G or 2.5G) communication protocols, third-generation (3G) communication protocols, fourth-generation (4G) communication protocols, WiFi, and/or any other wireless access network communication protocol.

In the example of FIG. 1A, wireless access point 110B may be configured to serve a wireless local area network at small cell 112B. For example, small cell 112B may be implemented as a picocell, a femtocell, and the like served by wireless access points 110B, examples of which include a picocell base station, a femtocell base station, a home base station, a WiFi access point, a WLAN access point, and a home E-UTRAN node B base station (HeNB) configured in accordance with standards, such as Third Generation Partnership Project (3GPP) Long Term Evolution (LTE).

Although certain standards and technologies are described herein, these references are example as other standards and technologies may be used as well.

System 100 may include wireless access links. These access links may include downlinks for transmitting to user equipment and an uplink for transmitting from user equipment to a base station. The downlinks and uplinks may each comprise a modulated radio frequency carrying information, such as security information, control (RRC) messages, and the like. Moreover, the access points may include links, such as backhaul links, to other networks (for example, other mobile networks, the Internet, and the like), network nodes (for example, security server 195), and the like.

Security server 195 may be coupled via wireless or wired backhaul lines (or connections) to a base station, such as base station 110A. Security server 195 may be configured to provide security policies (for example, rules) to one or more user equipment. These policies may take into account user preferences, corporate policies/preference, or a combination of both. Moreover, the updates may take into account vulnerabilities regarding the use of certain connection types, applications, functions, encryption algorithms, and the like. For example, if a vulnerability to a certain application, function, and the like becomes known, security server 195 may, in response the vulnerability being known, be configured to send an update that takes into account the vulnerability. Specifically, the policy update may prevent the use of the compromised application, function, and the like and/or prompt a caution for display at the user equipment if the application, function, and the like are going to be used.

Although FIG. 1A depicts three access points 110A-C, three cells 112A-C, a single server 195, and a single user equipment 114, system 100 may include other quantities and types of wireless access points, cells, and user equipment as well.

Figure 2:
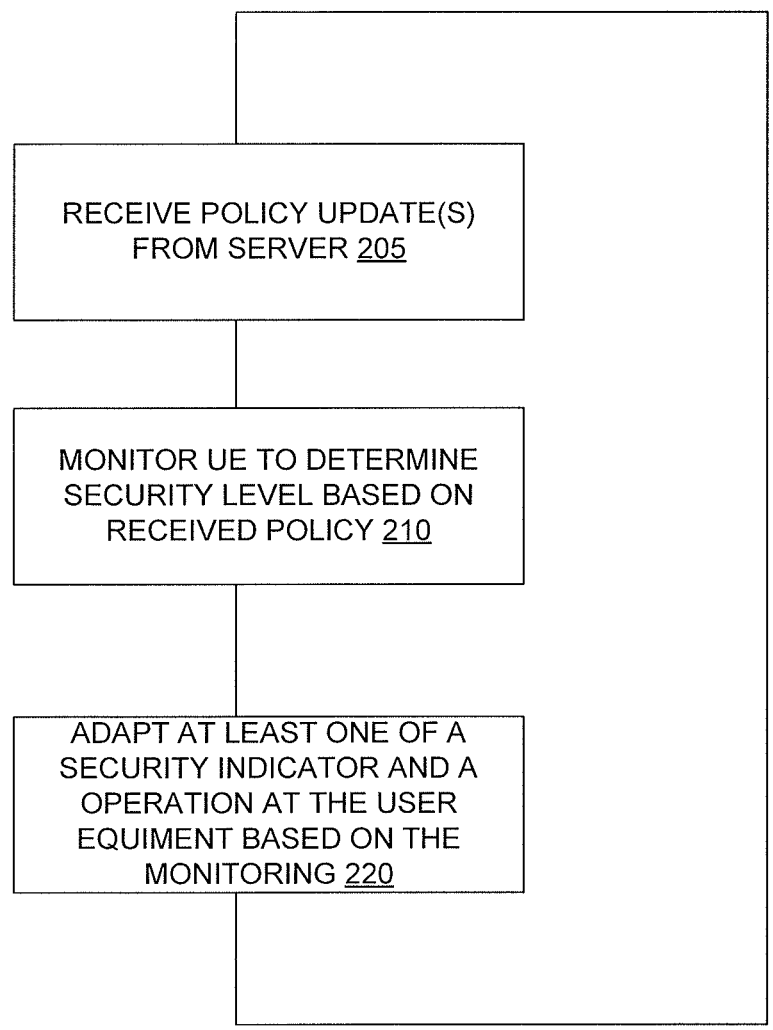
FIG. 2 depicts an example of a process for adaptive security, in accordance with some exemplary embodiments.

FIG. 2 depicts an example process 200 for adaptive security, in accordance with some example embodiments. The description of FIG. 2 also refers to FIG. 1A.

At 205, user equipment 114 may receive at least one policy update from security server 205, in accordance with some example embodiments. The policies received by adaptive security controller 190A (which are provided by at least security server 195) may map security levels of the user equipment to operations at the user equipment. Furthermore, the polices may be defined by the security server 195 and/or any other entity as well. The policies may relate to one or more actions (for example, functions, operations, and/or applications) at the user equipment. To illustrate, a policy may define one or more of the following: a certain security level given a type of connection, such as 2G, 3G, WiFi, and the like; a certain security level given a type of encryption algorithm being used; a certain security level given a certain application or function being used; and/or the like. The security policy may also be based also on location. For example, some locations (which can be identified by a mobile country code of an operator and/or other geographic/location indication) may be considered unsecure for some actions and thus require additional security need to be applied before performing the action. An entity (for example, a regulatory entity and the like) may also establish a policy that requires, for example, security updates to be performed before an in-phone-identification-card is used.

Furthermore, the policy and/or security level may be mapped to a certain application or function. To illustrate, a policy may require a high security level of, for example, 1 when sending financial information via a certain application (for example, a mobile payment application). In this example, a policy may also define that a first encryption type has a low level of security, for example 5, while a second encryption type has a higher level of security, for example, 1. Thus, in this example, when a user attempts to use the mobile payment application with the first encryption type, the adaptive security indicator 190B may indicate a level of 5, and the adaptive security controller 190A may inhibit the use of the mobile payment application based on the monitored state of the user equipment and the policies.

To illustrate further, a policy may require a high security level, for example 1 when sending confidential information. In this example, a policy may also define that connections using 2G or WiFi have a low level of security, for example 4, while 3G or SMS has a higher level of security, for example, 1. Thus, in this example, when a user attempts to send confidential personal or company information via WiFi, the adaptive security indicator 190B may indicate a level of 4 and the adaptive security controller 190A may inhibit the sending based on the monitored state of the user equipment and the policies.

In the example below at Table 1, policies are depicted. For example, if a mobile payment application is used, a security level of at least 1 (which in this example represents the highest security level) is required, although other schemes may be used to indicate the security level as well. As a result, adaptive security controller 190A may inhibit for example SMS and public WiFi connections for transmitting mobile payment application data.

TABLE 1

Policy Examples

| Operation | Level |
|---|---|
| Mobile payment application | 1 |
| Encryption algorithm A | 1 |
| Send personal emails | 5 |
| Send company confidential emails | 1 |
| Connection type SMS | 2 |
| Connection type 3G | 1 |
| Connection type WiFi | 4 |

In some example embodiments, security server 195 may provide an update based on an event. For example, an update may be provided to user equipment 114 when a security alert indicates that a certain encryption type has a vulnerability. Rather than static policies at the user equipment, the security server 195 pushes a policy update to adapt the policies at the user equipment. Referring to the previous example, a policy update may also indicate that the second encryption type (which previously had level 1) is downgraded to a lower, level security 2 based on a discovered vulnerability of the second encryption algorithm. When this is the case, the mobile payment application using this second encryption algorithm may be inhibited (for example, prevented or cautioned) from using the second encryption algorithm after receiving the updated policy.

In some example embodiments, the updates may be triggered by an event at the user equipment as well. For example, when a function, such a certain operation or application is being used at the user equipment, the user equipment may request from security server 195 a policy update. The policy updates may be triggered by other events (for example, software or hardware updates at the user equipment), security risk assessments of certain operations or applications being used at the user equipment, company policies (for example, in an enterprise deployment/setting), a connection being established or torn down, and/or any other event.

At 210, user equipment 114 may, in some example embodiments, monitor its policies provided at 205 and the current configuration (or state of the user equipment). The user equipment 114 including adaptive security controller 190A may monitor the configuration of the user equipment, such as what applications are being used, connection types being used, encryption algorithm types being used, and the like. For example, as user equipment 114 may change connections from a first base station to a second base station, adaptive security controller 190A may monitor the connection types in order to assess the security level of the user equipment. For example, a policy may define that a WiFi or a 2G connection may be seen as less secure than an SMS or 3G or 4G connection. Moreover, when applications are used on user equipment 114, adaptive security controller 190A may monitor execution (or initiation of) the applications in order to assess the security level of the user equipment. For example, if an application poses a security risk (for example, a browser with a known vulnerability), adaptive security controller 190A may monitor launch of the application and inhibit its use as disclosed herein.

At 220, the adaptive security indicator 190B and/or an operation at the user equipment may be adapted, in accordance with some example embodiments. For example, the security level may be adapted from a first level to a second based on the updated policy received at 205 and monitoring at 210. When this is the case, adaptive security controller 190A may adapt the graphical indication provided by adaptive security indicator 190B to reflect the change in level. When the security level changes from a first level to a second level, adaptive security controller 190A may also adapt the operation of the user equipment by inhibiting its use (for example, preventing use of a function, such as an application and the like, and/or generating a cautionary message regarding the risk of its use).

In some example embodiments, the adaptive security controller 190B may adapt the user equipment by disabling and/or generating a caution message before a certain application or operation is invoked. Moreover, if the user proceeds to use the cautioned application/operation, the adaptive security controller 190A may send an indication to adaptive security indicator 190B to change the security level (to for example a lower (or less secure) security level).

In some example embodiments, when a security level changes levels based on the monitoring, a message (or prompt) may be presented at the user equipment to notify a user of the change. When a connection is disrupted or changes, the adaptive security controller 190A may re-assess the security level at 220 and generate a message and/or inhibit an operation based on the change in security level.

In some example embodiments, the user equipment 114 must authenticate itself (for example, using credentials stored at, for example, a trusted storage mechanism at the user equipment 114) to the base station 110A and/or security server 195 before receiving the policy updates at 205.

In some example embodiments, the adaptive security controller 190A is executed in a trusted environment (TRE), such as a eUICC (embedded universal integrated circuit card), a subscriber identity module (SIM), or Trusted Execution Environment (TEE), and/or any other secure environment.

In some example embodiments, the adaptive security indicator 190A is executed in a trusted environment (TRE) as a secure application. Moreover, the display may be a trusted display as well.

In some example embodiments, the policies used by the adaptive security controller 190A may be stored in the TRE. The TRE may also store the data in encrypted form outside and only control the decryption and keys. In some example embodiments, the updates sent at 205 may be performed securely using for example SIM over-the-air (OTA) updates, Open Mobile Alliance (OMA) Device Management, and/or any other mechanism.

In some example embodiments, when the adaptive security indicator 190B presented on a display of the user equipment is selected (for example, by clicking, touching, and the like), the graphical indication may provide information regarding the reasons for a current level (for example, uninstalled security updates, a damaged algorithms, no encryption, and the like). This is generated from an evaluation of the policies and the current configuration of the user equipment.

In some example embodiments, adaptive security controller 190B may couple to a baseband chip to obtain information about the current configuration of the user equipment, such as connection type being used, encryption algorithm, applications being used, and the like.

In some example embodiments, the monitoring may also include monitoring time of day and/or location, and this information may be used to adapt the security level of the user equipment.

Figure 3:
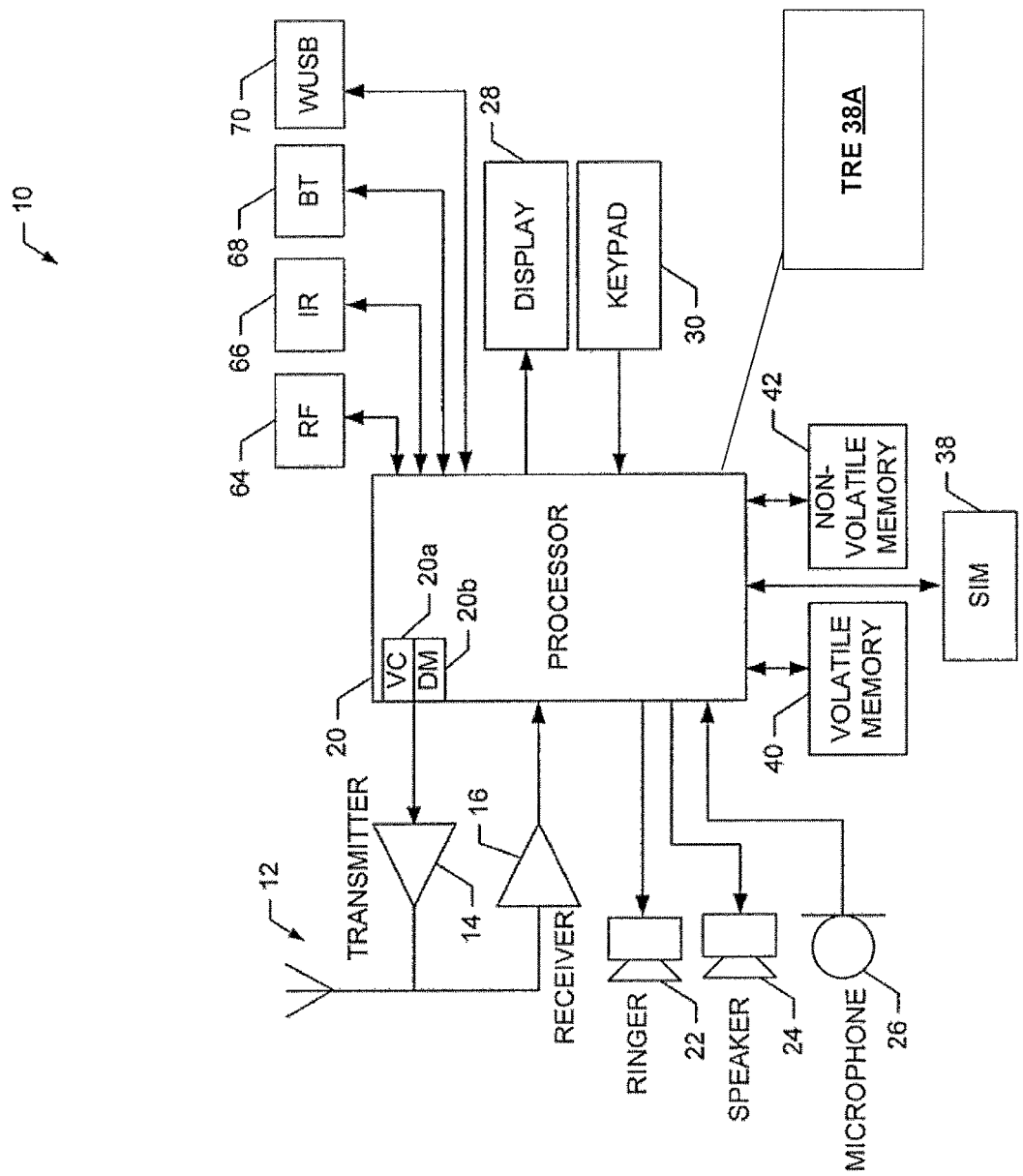
FIG. 3 depicts an example of a user equipment, in accordance with some exemplary embodiments.

FIG. 3 illustrates a block diagram of an apparatus 10, which can be configured as user equipment in accordance with some example embodiments.

The apparatus 10 may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including processor circuitry, such as at least one processing core, one or more microprocessors with accompanying digital signal processor(s), one or more processor(s) without an accompanying digital signal processor, one or more coprocessors, one or more multi-core processors, one or more controllers, one or more computers, various other processing elements including integrated circuits (for example, an application specific integrated circuit (ASIC), a field programmable gate array (FPGA), and the like), or some combination thereof. Accordingly, although illustrated in FIG. 3 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and the like. In addition, these signals may include speech data, user generated data, user requested data, and the like.

The apparatus 10 may be capable of operating with one or more air interface standards, communication protocols, modulation types, access types, and the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and the like. Also, for example, the apparatus 10 may be capable of operating in accordance with 2.5G wireless communication protocols General Packet Radio Service (GPRS), Enhanced Data GSM Environment (EDGE), and the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and the like. The apparatus 10 may be additionally capable of operating in accordance with 3.9G wireless communication protocols, such as Long Term Evolution (LTE), Evolved Universal Terrestrial Radio Access Network (E-UTRAN), and the like. Additionally, for example, the apparatus 10 may be capable of operating in accordance with 4G wireless communication protocols, such as LTE Advanced and the like, as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and the like. Control and signal processing functions of the apparatus 10 may be allocated between these devices according to their respective capabilities. The processor 20 may additionally comprise an internal voice coder (VC) 20a, an internal data modem (DM) 20b, and the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol (HTTP), HTTPS (HTTP Secure), and the like.

Apparatus 10 may also comprise a user interface including, for example, an earphone or speaker 24, a ringer 22, a microphone 26, a display 28, a user input interface, and the like, which may be operationally coupled to the processor 20. The display 28 may, as noted above, include a touch sensitive display, where a user may touch and/or gesture to make selections, enter values, and the like. The processor 20 may also include user interface circuitry configured to control at least some functions of one or more elements of the user interface, such as the speaker 24, the ringer 22, the microphone 26, the display 28, and the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 3, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth (BT) transceiver 68 operating using Bluetooth wireless technology, a wireless universal serial bus (USB) transceiver 70, and the like. The Bluetooth transceiver 68 may be capable of operating according to low power or ultra-low power Bluetooth technology, for example, Wibree, radio standards. In this regard, the apparatus 10 and, in particular, the short-range transceiver may be capable of transmitting data to and/or receiving data from electronic devices within a proximity of the apparatus, such as within 10 meters, for example. The apparatus 10 including the WiFi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and the like.

The apparatus 10 may comprise memory, such as a subscriber identity module (SIM) 38, a removable user identity module (R-UIM), and the like, which may store information elements related to a mobile subscriber. Moreover, the apparatus 10 may include a trusted execution environment (TRE) 38A which may execute, in some example embodiments, the all or portion of process 200, the operations of the adaptive security controller 190A, and the like. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and the like which may be used by the apparatus for performing functions of the user equipment/mobile terminal. The memories may comprise an identifier, such as an international mobile equipment identification (IMEI) code, or similar device identity, capable of uniquely identifying apparatus 10. The functions may include one or more of the operations disclosed herein with respect to the user equipment, such as the functions disclosed at process 200. The memories may comprise an identifier, such as for example, an international mobile equipment identification (IMEI) code, capable of uniquely identifying apparatus 10. In the example embodiment, the processor 20 may be configured using computer code stored at memory 40 and/or 42 to receive policy updates, determine a configuration of the user equipment, and adapt the security of the user equipment, and the like as disclosed herein.

Figure 4:
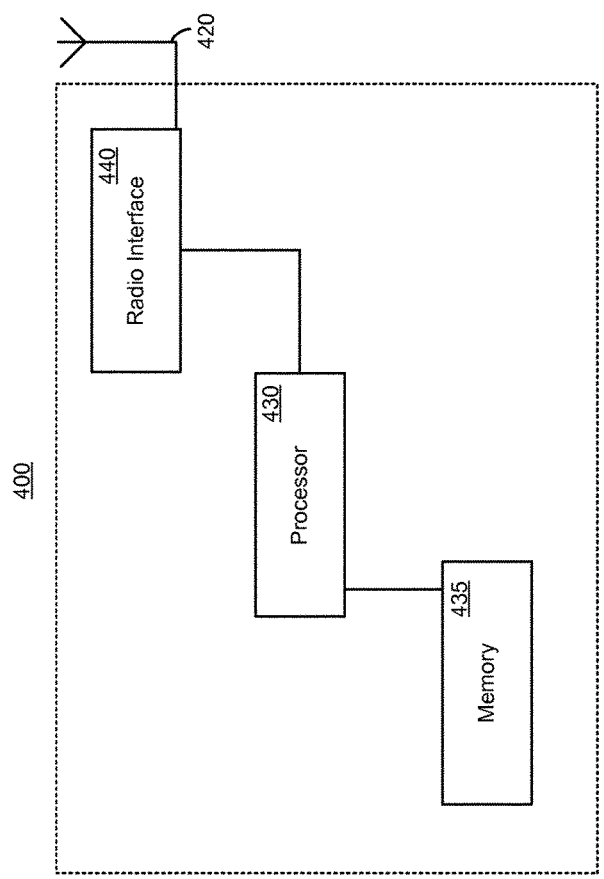
FIG. 4 depicts an example of a base station, in accordance with some exemplary embodiments.

FIG. 4 depicts an example implementation of a network node 400, such as base station 110A, access point 110B, and the like. The network node 400 may include one or more antennas 420 configured to transmit via a downlink and configured to receive uplinks via the antenna(s) 420. The network node 400 may include or be coupled to security server 195. The network node 400 may further include a plurality of radio interfaces 440 coupled to the antenna 420. The radio interfaces may correspond one or more of the following: Long Term Evolution (LTE, or E-UTRAN), Third Generation (3G, UTRAN, or high speed packet access (HSPA)), Global System for Mobile communications (GSM), wireless local area network (WLAN) technology, such as 802.11 WiFi and the like, Bluetooth, Bluetooth low energy (BT-LE), near field communications (NFC), and any other radio access technologies. The radio interface 440 may further include other components, such as filters, converters (for example, digital-to-analog converters and the like), mappers, a Fast Fourier Transform (FFT) module, and the like, to generate symbols for a transmission via one or more downlinks and to receive symbols (for example, via an uplink). The network node 400 may further include one or more processors, such as processor 430, for controlling the network node 400 and for accessing and executing program code stored in memory 435. In some example embodiments, memory 435 includes code, which when executed by at least one processor causes one or more of the operations described herein with respect to network node, such as a base station, access point, and the like. For example, network node 400 may send via a radio access network security updates to the user equipment.

The security server 195 may further include one or more processors, such as a processor (also referred to herein as processor circuitry) for accessing and executing program code stored in memory. In some example embodiments, the memory includes code, which when executed by at least one processor causes one or more of the operations described herein with respect to security server 195, such as generate and send security updates.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIGS. 3 and 4. A computer-readable medium may comprise a non-transitory computer-readable storage medium that may be any media that can contain or store the instructions for use by or in connection with an instruction execution system, apparatus, or device, such as a computer. Furthermore, some of the embodiments disclosed herein include computer programs configured to cause methods as disclosed herein (see, for example, process 200 and other functions/operations including the ones disclosed herein).

Without in any way limiting the scope, interpretation, or application of the claims appearing below, a technical effect of one or more of the example embodiments disclosed herein is providing security that adapts, based on network updates, to provide a dynamic indication of a security state of a user equipment and/or other active measures, such as inhibiting certain functions based on the current security state.

If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of the present invention as defined in the appended claims. Other embodiments may be within the scope of the following claims. The phrase "such as" may refer to one or more example which are not exclusive. The phrase "based on" includes "based on at least."

What is claimed:

1. A method comprising:
   receiving, at a user equipment, at least one policy update representative of a rule defining a security level of a plurality of security levels;
   mapping, by the user equipment and in response to receiving the at least one policy update, the security level to an operation performed by the user equipment and to an encryption algorithm, wherein the at least one policy update indicates a change in a vulnerability of the encryption algorithm;
   monitoring a configuration of the user equipment running the encryption algorithm to determine whether the configuration of the user equipment violates the at least one policy update; and
   adapting, based on the monitoring and the change in the vulnerability of the encryption algorithm, the operation at the user equipment, wherein the adapting comprises: preventing a use of an application running the encryption algorithm.

2. The method of claim 1, wherein the at least one policy update is updated at least one of periodically, when requested by the user equipment, and in response to an event prompting a change in policy, wherein the policy update is received from a server configured to provide a plurality of security policies including the at least one policy update.

3. The method of claim 2, wherein the event comprises a security event indicating a vulnerability to the user equipment.

4. A method of claim 1, wherein the operation further comprises at least one of an application at the user equipment, a type of connection between the user equipment and a network, and a function at the user equipment.

5. A method of claim 1, wherein the adapting further comprises:
generating, based on a result of the monitoring, a security indicator as a graphical indicator representing a plurality of security levels including the security level.

6. The method of claim 1, wherein the result of the monitoring indicates whether the configuration violates the at least one of the policy update, the at least one security level, or a combination thereof.

7. The method of claim 1, wherein the vulnerability of the encryption algorithm incudes a vulnerability of a data encryption standard.

8. An apparatus comprising:
at least one processor; and
at least one memory including computer program code, the at least one processor, the at least one memory, and the computer program code configured to cause the apparatus to at least:
receive at least one policy update representative of a rule defining a security level of a plurality of security levels;
map, in response to receiving the at least one policy update, the security level to an operation performed by the apparatus and to an encryption algorithm, wherein the at least one policy update indicates a change in a vulnerability of the encryption algorithm;
monitor a configuration of the user equipment running the encryption algorithm to determine whether the configuration of the user equipment violates the at least one policy update; and
adapt, based on the monitoring and the change in the vulnerability of the encryption algorithm, the operation at the user equipment, wherein adapting the operation at the user equipment causes the apparatus to prevent a use of an application running the encryption algorithm.

9. The apparatus of claim 8, wherein the at least one policy update is updated at least one of periodically, when requested by the apparatus, and in response to an event prompting a change in policy, wherein the policy update is received from a server configured to provide a plurality of security policies including the at least one policy update.

10. The apparatus of claim 9, wherein the event comprises a security event indicating a vulnerability to the apparatus.

11. An apparatus of claim 8, wherein the operation further comprises at least one of an application at the apparatus, a type of connection between the apparatus and a network, and a function at the apparatus.

12. An apparatus of claim 8, wherein the apparatus is further configured to at least generate, based on a result of the monitoring, a security indicator as a graphical indicator representing a plurality of security levels including the security level.

13. The apparatus of claim 8, wherein the result of the monitoring indicates whether the configuration violates the at least one of the policy update, the at least one security level, or a combination thereof.

14. The apparatus of claim 8, wherein the vulnerability of the encryption algorithm incudes a vulnerability of a data encryption standard.

15. A non-transitory computer-readable storage medium including computer code which when executed by at least one processor causes operations comprising:
receiving, at a user equipment, at least one policy update representative of a rule defining a security level of a plurality of security levels;
mapping, in response to receiving the at least one policy update, the security level to an operation performed by the user equipment and to an encryption algorithm, wherein the at least one policy update indicates a change in a vulnerability of the encryption algorithm;
monitoring a configuration of the user equipment running the encryption algorithm to determine whether the configuration of the user equipment violates the at least one policy update; and
adapting, based on the monitoring and the change in the vulnerability of the encryption algorithm, the operation at the user equipment, wherein the adapting comprises:
preventing a use of an application running the encryption algorithm.

* * * * *